United States Patent [19]

Krohn

[11] Patent Number: 5,513,966

[45] Date of Patent: May 7, 1996

[54] MISALIGNMENT COMPENSATING MANIFOLD FOR TWIN PUMPS

[76] Inventor: Duane Krohn, 4831 W. 101st Cir., Westminster, Colo. 80030

[21] Appl. No.: 465,721

[22] Filed: Jun. 6, 1995

[51] Int. Cl.⁶ .................................................. F04B 53/16
[52] U.S. Cl. ........................ 417/533; 417/572; 285/24; 285/150; 285/405
[58] Field of Search ................................. 417/533, 539, 417/572; 285/150, 24, 405, 363, 27

[56] References Cited

U.S. PATENT DOCUMENTS

| 317,422 | 5/1885 | Sprinkle | 417/533 |
| 1,030,107 | 6/1912 | McCormick | 285/150 |
| 1,632,948 | 6/1927 | Cardenas | 417/533 |
| 5,299,921 | 4/1994 | Richter | 417/539 |

FOREIGN PATENT DOCUMENTS 2175661  12/1986  United Kingdom .................... 285/24

*Primary Examiner*—Richard A. Bertsch
*Assistant Examiner*—Roland G. McAndrews, Jr.

[57] ABSTRACT

A liquid manifold for connecting to adjacent pumps, wherein the manifold has two sections. Each section is independently connected to a liquid pump and threadably secured to the pump at a position which provides the most precise alignment of the respective manifold sections. The manifold sections are then affixed together by fasteners through openings in one manifold section which are larger than threaded openings in the other manifold section. The larger openings permit a predetermined amount of misalignment to be present while still permitting a tight sealable connection to be made by the two manifold sections.

10 Claims, 2 Drawing Sheets

MISALIGNMENT COMPENSATING MANIFOLD FOR TWIN PUMPS

BACKGROUND OF THE INVENTION

The present invention relates to an apparatus for coupling together the outputs of two liquid pumps to provide a single output delivery system. More particularly, the invention relates to a manifold for coupling two liquid pump outputs together in the workplace environment. The invention is particularly adaptable for use in connection with reciprocable pumps which are fixedly mounted and mechanically linked to a reciprocable drive motor. The inlets of pumps of this general type are typically immersed into a liquid container such as a 55-gallon drum, wherein the liquid material content of the drum is transported via conduits and/or hoses to remote locations. In cases where the volume of liquid to be delivered exceeds the reasonable pumping capacity of a single pump, it is not unusual to couple two pumps together to obtain the desired liquid delivery capacity. In the case of reciprocable pumps, it is desirable to stagger the pumping cycles of two interconnected pumps so that the pulsations normally associated with changeover during the reciprocation phase do not both occur at the same time. This results in a much smoother and more continuous liquid delivery system where the pressure fluctuations associated with changeover are less noticeable.

In the workplace environment, the interconnection of two reciprocable pumps is difficult to accomplish. Since each of the pumps is fixedly mounted, it is very difficult to interconnect them into a common manifold because of the physical alignment problems which are present. When two such pumps are physically positioned in a side-by-side arrangement, they are proximately positioned at the same vertical elevation. Small adjustments in vertical elevation can be made by threadably turning the respective pump cylinders, which can be done so long as the respective pump outlet ports end up in facing relationship for connection to a manifold section. The respective manifold sections must be properly aligned in both vertical and horizonal relationship so as to permit the manifold sections to be interconnected together to join the pump outlet ports to a common flow path.

The vertical alignment of the respective pump outlet ports can never be more precisely aligned than the pitch distance of approximately one thread of the respective pump cylinders. Similarly, the manifold sections can never be more closely horizontally aligned than approximately the pitch distance of the threaded members which secure the manifold sections to the respective pumps. This presents an uncontrollable misalignment condition even when the respective pumps and their manifold sections are aligned to the highest possible precision. It is, therefore, imperative that the manifold sections be designed so as to accommodate this amount of misalignment and yet be connected together to form a sealed manifold which is not susceptible of leakage.

SUMMARY OF THE INVENTION

The invention comprises a pair of manifold sections for respective connections to a pump outlet port and also for interconnecting to form a single unified manifold structure. Each manifold section has a threaded inlet bore for connection to a pump outlet via a threaded connecting member. Each manifold has a threaded outlet bore for connection to a suitable liquid flow path via a threaded coupler. One of the manifold sections has a plurality of threaded holes for securing a plurality of fasteners, and the other manifold section has a matched plurality of enlarged openings for the passage of the plurality of fasteners. The enlarged openings are sized so as to permit a small degree of misalignment of the two manifold sections, in both the horizontal and vertical direction, while at the same time to permit the fasteners to be inserted through the enlarged holes into the threaded holes and to tightly clamp the two manifold sections together to form a leak-free overall manifold structure.

It is the principal object of the present invention to provide a manifold for the interconnection of two reciprocable liquid pumps to form a common outlet.

It is another object of the present invention to provide a manifold having two sections, wherein each section may be independently attached to a respective pump, and the two sections may subsequently be interconnected to form the complete manifold.

It is an advantage of the present invention to provide a manifold in two sections which may be connected and disconnected under workplace environments.

It is a further advantage and object of the present invention to provide two manifold sections which may be tightly connected together in the workplace environment and which accommodate a small degree of misalignment of the respective manifold sections.

Further, it is an object and advantage of the present invention to provide manifold sections which may be connected together to accommodate physical displacements approaching the pitch dimension of the threaded members to which the manifolds are attached.

BRIEF DESCRIPTION OF THE DRAWINGS

The foregoing objects and advantages of the invention will become apparent from the following specification and claims and with reference to the appended drawings in which:

DESCRIPTION OF THE PREFERRED EMBODIMENT

Figure 1:
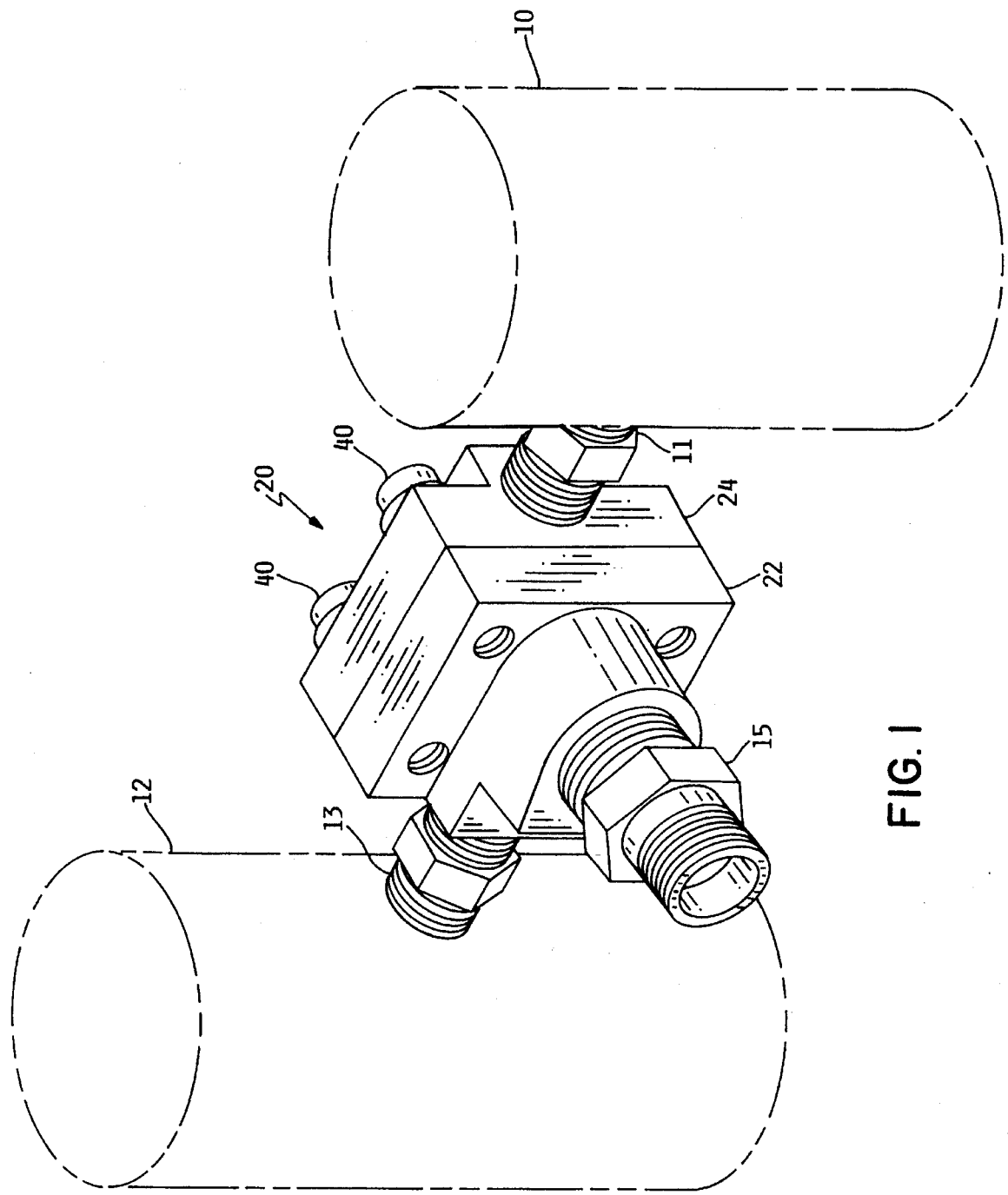
FIG. 1 shows an isometric view of the invention connected to two pumps.

FIG. 1 shows the invention in isometric view illustrating how the manifold 20 may be connected to two reciprocable pumps 10 and 12. Pumps 10 and 12 are shown in dotted outline, in representative form, and it is to be understood that this representative form is typical of a wide variety of reciprocable pumps which have a general cylindrical shape with a liquid inlet at the bottom of the pump, and a mechanical driving mechanism at the top of the pump. Pumps 10 and 12 are typically affixed to a wall mounting bracket or other fixed mounting assembly and are spaced apart by a predetermined and known distance. There is typically a vertical adjustment capability to permit the respective liquid outlets from the pumps to be aligned at the same vertical elevation. There is also typically a threaded rotational adjustment member associated with each pump so that the respective pump outlets may be rotatably adjusted about the pump's axis to place the respective pump outlets in approximate facing alignment.

The pump cylinders associated with pumps 10 and 12 are typically threaded into a pump housing by a threaded engagement with the top end of the cylinders. This threaded engagement permits a small degree of vertical adjustability for the cylinder position. The pump outlet ports are formed through the cylinder wall and are threaded to accept a liquid coupler which may either be connected to a delivery hose or other device. FIG. 1 shows a threaded coupler 11 connected to the outlet port of pump 10 and a threaded coupler 13 connected to the outlet port of pump 12. The respective distal ends of threaded couplers 11 and 13 are respectively connected to manifold sections 22 and 24 which themselves may be interconnected to form a manifold 20. The manifold section 22 has a flow-through passage which terminates at one end in a threaded outlet opening, which in FIG. 1 is connected to a threaded coupler 15. The manifold section 24 also has a flow-through passage and a threaded outlet port (not shown) similarly connected to a threaded coupler. The threaded couplers respectively connected to the flow-through passages of manifold 20 may be connected into a liquid delivery system in series flow relationship, or alternatively, one of the flow-through passages may be blocked by inserting a threaded plug into its outlet bore. In this situation, all of the liquid delivered by pumps 10 and 12 is delivered through the remaining manifold outlet port.

Figure 2:
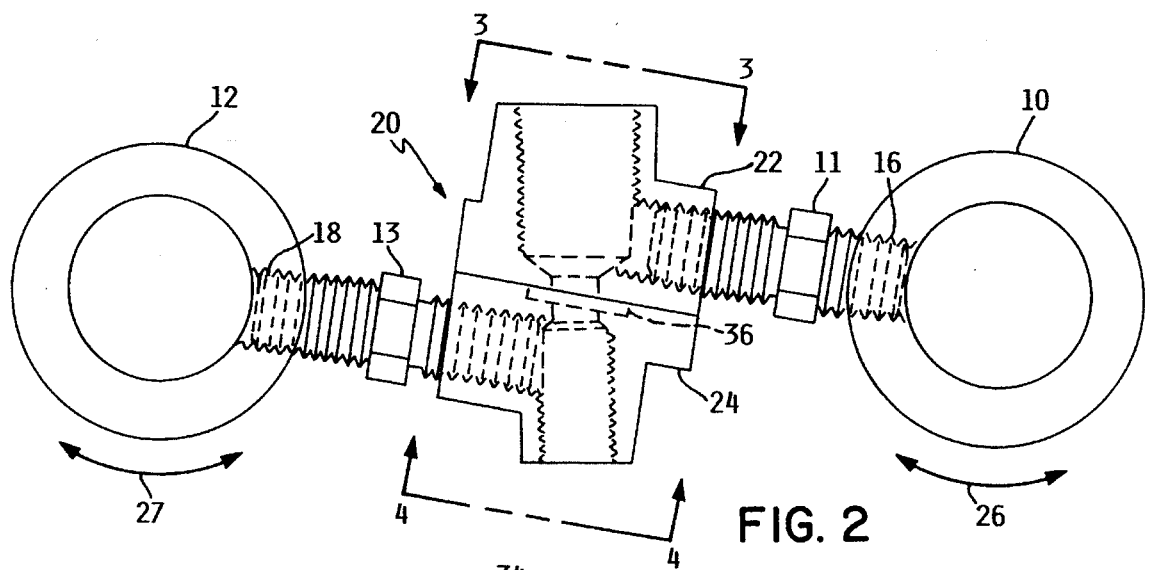
FIG. 2 shows a bottom view of the invention of FIG. 1.

FIG. 2 shows a top view of the manifold 20 in a typical construction connected to pumps 10 and 12. For convenience, the threaded couplers connected into the flow-through passages have been deleted. Pump 10 has a threaded outlet port 16 and pump 12 has a threaded outlet port 18. Threaded coupler 11 may be threadably inserted into outlet port 16 to form a sealed liquid outlet, and threaded coupler 13 may be threaded into outlet port 18 to form a sealed liquid outlet.

Pump 10 may be rotatably positioned about its axis as indicated by arrow 26 of FIG. 2. Similarly, pump 12 may be rotatably positioned about its axis as indicated by arrow 27. The first and second manifold sections 22, 24 are threadably attached to the respective couplers 11, 13. Couplers 11, 13 have a thread length which is sufficiently long so as to permit a significant adjustability in the position of the respective manifold sections relative to the respective pumps.

At the time the respective manifold sections 22, 24 are threadably attached to their couplers 11, 13, each manifold section is separated from the other. Pumps 10 and 12 may be rotatably positioned about their axis to rotatably separate the respective manifold sections. Each manifold section may then be threadably secured onto its coupler by a variable distance, the distance being selected so that when both manifold sections are attached they can be rotatably moved back into facing alignment as shown in FIG. 2, with a minimum amount of offset between the respective facing surfaces. However, it is appreciated that the manifold sections 22, 24 can seldom be perfectly aligned; because the closest alignment position has a resolution of no less than the distance of one thread pitch of the respective couplers 11, 13. In other words, even after manifold sections 22, 24 have been threaded onto their respective couplers by a distance which permits the closest possible alignment, there may still be at least one thread pitch of misalignment which cannot be corrected. Likewise, there may be a similar degree of misalignment in the vertical direction because of the thread pitch limitations in the respective cylinder adjustments. It is a principal objective of the present invention to permit the manifold sections to be sealably connected together even when this slight degree of misalignment is present.

Figure 3:
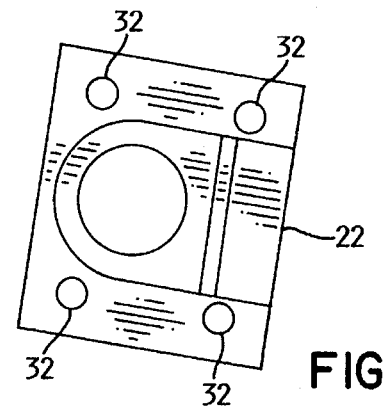
FIG. 3 shows a view taken along the lines 3—3 of FIG. 2.

FIG. 3 shows a view of manifold section 22 taken along the lines 3—3 of FIG. 2. A plurality of threaded openings 32 are formed through manifold section 22 to permit the attachment of threaded fasteners 40 (see FIG. 1).

Figure 4:
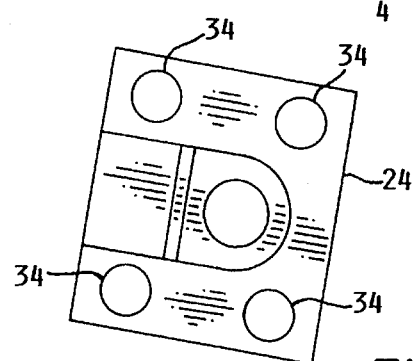
FIG. 4 shows a view taken along the lines 4—4 of FIG. 2.

FIG. 4 shows a view taken along the lines 4—4 of FIG. 2. A plurality of holes 34 are drilled through manifold section 24 to accommodate the insertion of fasteners 40, and to permit the fasteners 40 to be threaded into the threaded openings 32 of manifold section 22. The diameter of the holes 34 is approximately 20% greater than the diameter of the threaded holes 32, so that any given fastener which is sized for threading into holes 32 will loosely fit within holes 34. This permits a degree of misalignment of manifold section 22 relative to manifold section 24, while still permitting fasteners 40 to be tightly threaded into manifold section 22 and to thereby tightly secure the two manifold sections together. It is apparent that the holes 34 and the holes 32 are respectively uniformly spaced so as to be in perfect alignment whenever the respective manifold sections are perfectly aligned. However, if a small degree of offset is created by virtue of the thread pitch variations described hereinbefore, the relative positions of the fasteners in holes 34 may shift slightly; but the threaded portion of the fastener in threaded holes 32 will still permit the fasteners to be tightened. It should be noted that none of the holes 32, 34 are drilled in a position which intersects in any way any liquid passage in the respective manifold sections. This enables the use of larger holes 34 without fear of creating a leakage situation.

In the preferred embodiment, an enlarged channel is formed by a counter bore 36 in the flat surface of manifold section 24. This enlarged channel permits the free flow of liquids through the flow-through passages even though the passages themselves may be slightly misaligned due to the aforementioned misalignment problems.

In operation, the respective threaded couplers 11, 13 are first inserted into the cylinder outlet ports and threaded sufficiently securely as to form a liquid seal. Next, the respective cylinders are each rotated so as to move the threaded couplers away from each other. The manifold sections are then threaded onto each of the threaded couplers by a predetermined amount, and the cylinders are rotated so that the manifold sections are in relative facing alignment. The degree of misalignment of the respective manifold section is noted, and the cylinders are again rotated so as to permit repositioning of the manifold sections on either or both of the couplers so as to ensure the best possible alignment. The cylinders are again rotated to place the manifold sections in respective facing alignment, and the fasteners 40 are inserted through the holes 34, 32 and tightly secured. This will complete the construction of the manifold 20 for use in connection with the pumps 10, 12.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for combining the liquid outlets from two adjacent pumps into a single liquid manifold, comprising:
   a) a first manifold section having a first flow-through passage therethrough, said first flow-through passage having one opening through a flat surface of said first manifold section, and a first threaded transverse passage intersecting said first flow-through passage;
   b) a second manifold section having a second flow-through passage therethrough, said second flow-through passage having one opening through a flat surface of said second manifold section, and a second threaded transverse passage intersecting said second flow-through passage;

c) a first threaded fitting adjustably positioned in said first flow-through passage and connected to one of the outlets of one of said two adjacent pumps;

d) a second threaded fitting adjustably positioned in said second flow-through passage and connected to the other of the outlets of said two adjacent pumps;

e) a first array of holes through said first manifold section, opening through said first manifold section flat surface;

f) a second array of threaded openings through said second manifold section, opening through said second manifold section flat surface, said second array of threaded openings being alignable with said first array of holes and said first array of holes being larger than said second array of threaded openings; and g) a plurality of threaded fasteners sized for engaging each of said second array of threaded openings through said first array of holes, whereby said first and second manifold sections may be slidably aligned over the respective flat surfaces by the distance that said first array of holes is larger than said second array of threaded openings.

2. The apparatus of claim 1, wherein each of the holes in said first array of holes is approximately 20 percent larger than each of the openings of said second array of threaded openings.

3. The apparatus of claim 2, wherein said respective manifold flat surfaces are each parallel to respective transverse threaded openings.

4. The apparatus of claim 3, wherein said first and second arrays are approximately uniformly positioned about said respective flow-through passages.

5. The apparatus of claim 4, wherein said first flow-through passage one opening through a flat surface of said first manifold section further comprises an enlarged recessed channel in said flat surface, larger than said flow-through passage.

6. The apparatus of claim 4, wherein said second flow-through passage one opening through a flat surface of said second manifold section further comprises an enlarged recessed channel in said flat surface, larger than said flow-through passage.

7. A dual pump manifold for coupling together the liquid outlets of two adjacently-positioned liquid pumps, comprising:

a) A first threaded coupling attached to the liquid outlet of one of said two pumps, and a second threaded coupling attached to the liquid outlet of the other of said two pumps, each of said threaded couplings having a threaded end generally facing toward the other coupling;

b) a first manifold section having a first flow-through passage therethrough and a flat surface through which said first passage opens, and having a threaded transverse passage intersecting said first passage, said first manifold section connected to said first threaded coupling in said threaded transverse passage;

c) a second manifold section having a second flow-through passage therethrough and a flat surface through which said second passage opens, and having a threaded transverse passage intersecting said second passage, said second manifold section connected to said second threaded coupling in said threaded transverse passage;

d) a first array of holes through said first manifold section, opening through said flat surface, and arranged substantially uniformly about said first flow-through passage, each of the holes in said array of holes having a first diameter;

e) a second array of threaded holes through said second manifold section, opening through said flat surface, and arranged substantially uniformly about said second flow-through passage and alignable with said first array of holes, each of the holes in said second array of holes having a threaded diameter smaller than the diameter of the holes in said first array of holes; and f) a plurality of threaded fasteners sized for threaded engagement with said second array of threaded holes, and respectively connected through said first array of holes; whereby said first and second manifold sections may be slidably aligned over the respective flat surfaces and affixed together by the threaded fasteners.

8. The apparatus of claim 7, wherein the diameters of the holes in said first array of holes is about 20 percent larger than the diameters of the holes in said second array of threaded holes.

9. The apparatus of claim 8, wherein said respective manifold section flat surfaces are each parallel to respective transverse threaded openings.

10. The apparatus of claim 9, further comprising an enlarged channel about at least one of said first and second flow-through passages, in the flat surface through which said passages open.

* * * * *